(12) United States Patent
Chai et al.

(10) Patent No.: US 12,475,639 B2
(45) Date of Patent: Nov. 18, 2025

(54) SPATIALLY DISENTANGLED GENERATIVE RADIANCE FIELDS FOR CONTROLLABLE 3D-AWARE SCENE SYNTHESIS

(71) Applicants: Menglei Chai, Los Angeles, CA (US); Hsin-Ying Lee, San Jose, CA (US); Aliaksandr Siarohin, Los Angeles, CA (US); Sergey Tulyakov, Santa Monica, CA (US); Yinghao Xu, Los Angeles, CA (US); Ivan Skorokhodov, Los Angeles, CA (US)

(72) Inventors: Menglei Chai, Los Angeles, CA (US); Hsin-Ying Lee, San Jose, CA (US); Aliaksandr Siarohin, Los Angeles, CA (US); Sergey Tulyakov, Santa Monica, CA (US); Yinghao Xu, Los Angeles, CA (US); Ivan Skorokhodov, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 160 days.

(21) Appl. No.: 18/080,089

(22) Filed: Dec. 13, 2022

(65) Prior Publication Data
US 2024/0193855 A1 Jun. 13, 2024

(51) Int. Cl.
G06T 17/00 (2006.01)
G06T 3/40 (2024.01)
(Continued)

(52) U.S. Cl.
CPC ............... *G06T 17/00* (2013.01); *G06T 3/40* (2013.01); *G06T 5/50* (2013.01); *G06T 7/70* (2017.01);
(Continued)

(58) Field of Classification Search
CPC ............ G06T 17/00; G06T 3/40; G06T 5/50; G06T 7/70; G06T 2207/20221; G06T 2210/61;
(Continued)

(56) References Cited

U.S. PATENT DOCUMENTS

| 2022/0114787 A1* | 4/2022 | Loodin Ek ............ G06T 17/005 |
| 2023/0146181 A1* | 5/2023 | Meshkin ................... G06N 3/04 382/274 |
| 2024/0062495 A1* | 2/2024 | Shu ......................... G06T 17/00 |
| 2024/0290059 A1* | 8/2024 | Zhang .................. G11B 27/031 |

OTHER PUBLICATIONS

International Search Report and Written Opinion for International Application No. PCT/US2023/083497, dated Apr. 24, 2024 (Apr. 24, 2024)—10 pages.

(Continued)

*Primary Examiner* — Xiao M Wu
*Assistant Examiner* — Latrell Anthony Creary
(74) *Attorney, Agent, or Firm* — CM Law; Stephen J. Weed (57) ABSTRACT

A 3D-aware generative model for high-quality and controllable scene synthesis uses an abstract object-level representation (i.e., 3D bounding boxes without semantic annotation) as the scene layout prior, which is simple to obtain, general to describe various scene contents, and yet informative to disentangle objects and background. An overall layout for the scene is identified and then each object is located in the layout to facilitate the scene composition process. The object-level representation serves as an intuitive user control for scene editing. Based on such a prior, the system spatially disentangles the whole scene into object-centric generative radiance fields by learning on only 2D images with global-local discrimination. Once the model is trained, users can generate and edit a scene by explicitly controlling the camera and the layout of objects' bounding boxes.

15 Claims, 6 Drawing Sheets

(51) Int. Cl.
  *G06T 5/50* (2006.01)
  *G06T 7/70* (2017.01)
  *G06V 10/25* (2022.01)

(52) U.S. Cl.
  CPC .... *G06V 10/25* (2022.01); *G06T 2207/20221* (2013.01)

(58) Field of Classification Search
  CPC ............ G06T 2219/2016; G06T 15/08; G06T 15/20; G06T 19/20; G06V 10/25; G06V 20/00; G06V 10/82
  See application file for complete search history.

(56) References Cited

OTHER PUBLICATIONS

Kundu Abhijit et al: "Panoptic Neural Fields: A Semantic Object-Aware Neural Scene Representation" 2022 IEEE/CVF Conference on Computer Vision and Pattern Recognition (CVPR), IEEE, Jun. 18, 2022 (Jun. 18, 2022), pp. 12861-12871.

Thu Nguyen-Phuoc et al: "BlockGAN: Learning 3D Object-aware Scene Representations from Unlabelled Images", arxiv.org, Cornell University Library, 201 Olin Library Cornell University Ithaca, NY 14853, Dec. 2, 2020 (Dec. 2, 2020).

Xue Yang et al: "Giraffe HD: A High-Resolution 3D-aware Generative Model", 2022 IEEE/CVF Conference on Computer Vision and Pattern Recognition (CVPR), IEEE, Jun. 18, 2022 (Jun. 18, 2022), pp. 18419-18428.

\* cited by examiner

SPATIALLY DISENTANGLED GENERATIVE RADIANCE FIELDS FOR CONTROLLABLE 3D-AWARE SCENE SYNTHESIS

TECHNICAL FIELD

Examples set forth herein generally relate to generation of three-dimensional (3D) scenes and, in particular, to methods and systems for generating complex 3D scenes from single-view data.

BACKGROUND 3D-consistent image synthesis from single-view two-dimensional (2D) data has become a trendy topic in generative modeling. Recent approaches like Generative Radiance Fields (GRAF) and Periodic Implicit Generative Adversarial Networks (PiGAN) introduce 3D inductive bias by taking neural radiance fields as the underlying representation, gaining the capability of geometry modeling and explicit camera control. Despite their success in synthesizing individual objects (e.g., faces, cats, cars), these approaches struggle on scene images that contain multiple objects with non-trivial layouts and complex backgrounds. The varying quantity and large diversity of objects, along with the intricate spatial arrangement and mutual occlusions, bring enormous challenges, which exceed the capacity of the object-level generative models.

Generative Adversarial Networks (GANs) have achieved success in 2D image synthesis and have recently been extended to 3D-aware image generation. Visual Object Networks (VON) and HoloGAN introduce voxel representations to the generator and use neural rendering to project 3D voxels into 2D space. GRAF and PiGAN propose to use implicit functions to learn neural radiance fields (NeRF) from single-view image collections, resulting in better multi-view consistency compared to voxel-based methods. Generative Occupancy Fields (GOF), a shading guided generative implicit model (ShadeGAN), and Generative Radiance Manifolds (GRAM) introduce occupancy field, albedo field and radiance surface instead of radiance field to learn better 3D shapes. However, high-resolution image synthesis with direct volumetric rendering is usually expensive. Many prior systems resort to convolutional up-samplers to improve the rendering resolution and quality with lower computation overhead. Some other prior systems adopt patch-based sampling and sparse-voxel to speed up training and inference. Unfortunately, most of these methods are restricted to well-aligned objects and fail on more complex, multi-object scene imagery.

Recent efforts towards 3D-aware scene synthesis have fundamental drawbacks. For example, Generative Scene Networks (GSN) achieve large-scale scene synthesis by representing the scene as a grid of local radiance fields and training on 2D observations from continuous camera paths. However, object-level editing is not feasible due to spatial entanglement and the lack of explicit object definition. On the contrary, Generative Neural Feature Fields (GIRAFFE) explicitly composites object-centric radiance fields to support object-level control. However, GIRAFFE works poorly on challenging datasets containing multiple objects and complex backgrounds due to the absence of proper spatial priors.

Scene generation has been a longstanding task. Early systems like image parsing systems attempt to model a complex scene by trying to generate it. Recently, with the successes in generative models, scene generation has been advanced significantly. One approach is to resort to the setups of image-to-image translation from given conditions, i.e., semantic masks and object-attribute graph. Although semantic masks and object-attribute graph systems can synthesize photorealistic scene images, semantic masks and object-attribute graph systems struggle to manipulate the objects in 3D space due to the lack of 3D understanding. Some prior systems reuse the knowledge from 2D GAN models to achieve scene manipulation like the camera pose. However, such prior systems suffer from poor multi-view consistency due to inadequate geometry modeling. Another prior approach explores adding 3D inductive biases to the scene representation. BlockGAN and GIRAFFE introduce compositional voxels and radiance fields to encode the object structures, but their object control can only be performed for simple diagnostic scenes. GSN proposes to represent a scene with a grid of local radiance fields. However, since the local radiance field does not properly link to the object semantics, individual objects cannot be manipulated with versatile user control.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

A 3D-aware generative model for high-quality and controllable scene synthesis is described herein that uses an abstract object-level representation (i.e., 3D bounding boxes without semantic annotation) as the scene layout prior, which is simple to obtain, general to describe various scene contents, and yet informative to disentangle objects and background. The object-level representation serves as an intuitive user control for scene editing. Based on such a prior, the system described herein spatially disentangles the whole scene into object-centric generative radiance fields by learning on only 2D images with global-local discrimination. The disclosed system obtains the generation fidelity and editing flexibility of individual objects while being able to efficiently compose objects and the background into a complete scene. This is unlike existing 3D-aware image synthesis approaches that focus on generating a single canonical object and show limited capacity in composing a complex scene containing a variety of objects.

To achieve high-quality and controllable scene synthesis that addresses the limitations in the art, the scene representation is the design focus. An overall layout for the scene is identified and then each object is located in the layout to facilitate the scene composition process. From this vantage point, an abstract object-oriented scene representation, namely a layout prior, facilitates learning from challenging 2D data as a lightweight supervision signal during training and allows user interaction during inference. More specifically, to make such a prior easy to obtain and generalizable across different scenes, the prior is defined as a set of object bounding boxes without semantic annotation, which describes the spatial composition of objects in the scene and supports intuitive object-level editing.

The 3D-aware generative system and method for complex scene synthesis described herein allows for high-quality scene synthesis on challenging datasets and flexible user control of both the camera and scene objects. Using the layout prior, system spatially disentangles the scene into compositable radiance fields which are shared in the same object-centric generative model. To make the best use of the prior as a lightweight supervision during training, global-local discrimination is used that attends to both the whole scene and individual objects to enforce spatial disentanglement between objects and against the background. Once the model is trained, users can generate and edit a scene by explicitly controlling the camera and the layout of objects' bounding boxes. An efficient rendering pipeline is provided that is tailored for the spatially-disentangled radiance fields (SDRF), which significantly accelerates object rendering and scene composition for both training and inference stages. Qualitative and quantitative results evaluated on diverse datasets demonstrate that, compared to existing baselines, the described method achieves state-of-the-art performance in terms of both generation quality and editing capability.

The present disclosure provides systems, methods, and computer-readable media with instructions, that when executed, perform operations including generating individual objects and a background of a three-dimensional (3D) scene. For example, the method includes receiving, by an object generator, a data set of input images and 3D bounding boxes of objects in the input images and a layout prior of a scene in the input images. The object generator generates an object for each 3D bounding box, and a background generator generates a background of the scene. A volume renderer generates a version of the scene from the objects for each 3D bounding box and the background of the scene. The method further enables a user to manipulate the objects in the layout prior to create a manipulated layout prior and to provide the manipulated layout prior to the object generator to generate a scene with the objects in positions, orientations, and scales represented in the manipulated layout prior. For example, the user may manipulate a 3D bounding box using ray casting from a viewpoint of the user.

The method further includes generating a generative data model by training on a data set of images and 3D bounding boxes for implementing spatially disentangled generative radiance fields. The training includes receiving, by the object generator, data sets of input images and 3D bounding boxes of objects in the input images and a layout prior of scenes in the input images; generating, by the object generator, an object for each 3D bounding box; generating, by the background generator, a background of the scenes; and generating, by the volume renderer, versions of the scenes from the objects for each 3D bounding box and the background of the scenes. Global-local discrimination is then performed by determining, by a scene discriminator, whether the versions of the scenes in input images are real or fake to differentiate scenes, and by determining, by an object discriminator, from a crop of objects in the input images whether objects are real or fake to train the generative data model. The generative data model may be used during inference to generate the scene with the objects in positions, orientations, and scales represented in the manipulated layout prior. Generating, by the object generator, the object for each 3D bounding box may include generating spatially disentangled generative radiance fields of the object for each 3D bounding box based on the layout prior to generate individual objects and the background of the scene.

A detailed description of the methodology for providing for generating complex 3D scenes from single-view data will now be described with reference to FIGS. 1-7. Although this description provides a detailed description of possible implementations, it should be noted that these details are intended to be exemplary and in no way delimit the scope of the inventive subject matter.

Figure 1:
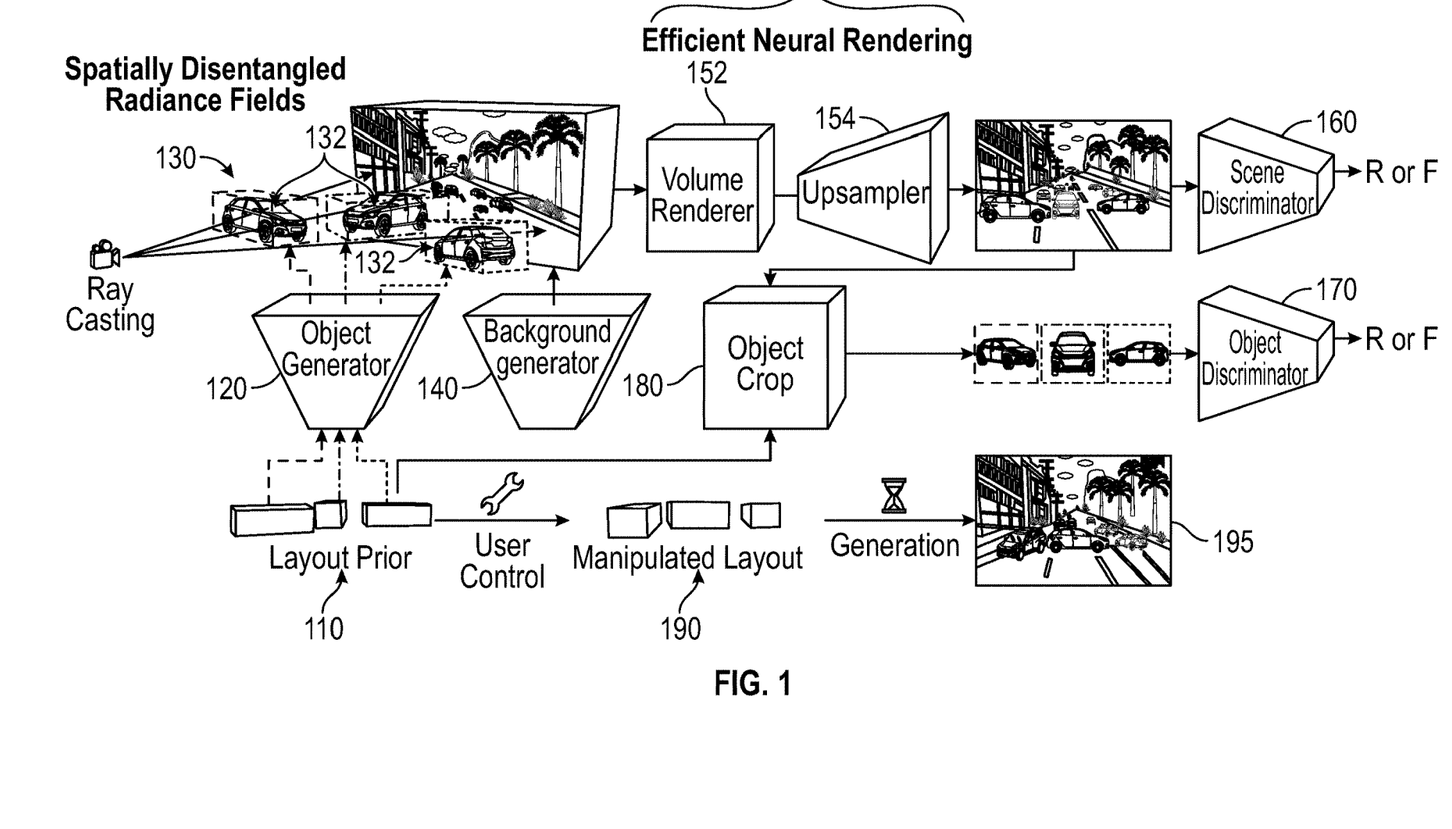
FIG. 1 is an illustration of the overall framework of a system for spatially disentangling generative radiance fields to generate individual objects and the background of a 3D scene in a sample configuration.

FIG. 1 is an illustration of the overall framework of a system 100 for spatially disentangling generative radiance fields to generate individual objects and the background of a 3D scene in a sample configuration. As shown, conditioned by the layout prior 110, the object generator 120 generates spatially disentangled generative radiance fields 130 of individual objects. For example, bounding boxes 132 may be placed around respective vehicles in a scene as shown. The scene layout is defined and the coordinates of the bounding boxes are identified to determine the absolute positions in the scene. The background is separately generated by the background generator 140. A neural rendering pipeline 150 includes a volume renderer 152 that composites the scene to a low-resolution feature map to place the objects in the scene and an up-sampler 154 that up-samples to the final high-resolution image. During training, global-local discrimination is provided by applying the scene discriminator 160 to the entire image and the object discriminator 170 to cropped object patches output by object cropper 180. During inference, a user can manipulate the layout by manipulating the bounding boxes into manipulated layout 190 to control the generation of a specific scene 195 at the object level. Ray casting software may be used to manipulate the bounding boxes 132 from the viewpoint of the user. The user is not required to have a particular viewpoint.

As noted above, layout of the scene is provided as an explicit layout prior 110 to disentangle objects. Based on the layout prior 110, spatially disentangled radiance fields 130 and a neural rendering pipeline 150 achieve controllable 3D-aware scene generation. The global-local discrimination makes training on challenging datasets possible. The model's training and inference details on 2D image collections are also described below.

Those skilled in the art will appreciate that there exist many representations of a scene, including the popular choice of scene graph, where objects and their relations are denoted as nodes and edges. Although a graph can describe a scene in rich details, its structure is hard to process and the annotation is laborious to obtain. Therefore, the scene layout is represented herein in a much-simplified manner, namely, as a set of bounding boxes $B=\{B_i | i \in [1, N]\}$ without category annotation, where N counts objects in the scene. Each bounding box is defined with 9 parameters, including rotation $a_i$, translation $t_i$, and scale $s_i$ as follows:

$$B_i=[a_i,t_i,s_i], \quad (1)$$

$$a_i=[a_x,a_y,a_z], t_i=[t_x,t_y,t_z], s_i=[s_x,s_y,s_z], \quad (2)$$

where $a_i$ comprises 3 Euler angles, which are easier to convert into rotation matrix $R_i$. Using this notation, the bounding box $B_i$ can be transformed from a canonical bounding box C, i.e., a unit cube at the coordinate origin as follows:

$$B_i=b_i(C)=R_i \cdot \text{diag}(s_i) \cdot C + t_i, \quad (3)$$

where $b_i$ stands for the transformation of $B_i$ and diag(•) yields a diagonal matrix with the elements of $s_i$. Such an abstract bounding box layout is more friendly to collect and easier to edit, allowing for versatile interactive user control.

Neural radiance field (NeRF) $F(x, v) \to (c, \sigma)$ regresses color $c \in \mathbb{R}^3$ and volume density $\sigma \in \mathbb{R}$ from coordinate $x \in \mathbb{R}^3$ and viewing direction $v \in S^2$, parameterized with multi-layer perceptron (MLP) networks. It has been proposed in the prior art to condition NeRF with a latent code z, resulting in the generative forms $G(x, v, z) \to (c, \sigma)$, to achieve 3D-aware object synthesis.

Since the layout is used herein as an internal representation, it naturally disentangles the whole scene into several objects. Multiple individual generative NeRFs may be leveraged to model different objects, but it can easily lead to an overwhelmingly large number of models and poor training efficiency. To alleviate this issue, a generative object radiance field is inferred in the canonical space to allow weight sharing among objects as follows:

$$(c_i,\sigma_i)=G_{obj}(b_i^{-1}(\gamma(x)),z_i), \quad (4)$$

where $\gamma(\cdot)$ is the position encoding function that transforms input into Fourier features. The object generator $G_{obj}(\cdot)$ infers each object independently, resulting in spatially disentangled generative radiance fields. $G_{obj}(\cdot)$ is not conditioned on the viewing direction v because the up-sampler 154 of the neural rendering pipeline 150 can learn the view-dependent effects, as noted below.

Although object bounding boxes are used as a prior, their latents are still randomly sampled regardless of their spatial configuration, leading to illogical arrangements. To synthesize scene images and infer object radiance fields with proper semantics, the location and scale of each object is adopted as a condition for the generator to encode more consistent intrinsic properties, i.e., shape and category. To this end, Equation (4) is modified by concatenating the latent code with the Fourier features of object location and scale as follows:

$$(c,\sigma)=G_{obj}(b_i^{-1}(\gamma(x)),\text{concat}(z_i,\gamma(t_i),\gamma(s_i))). \quad (5)$$

Therefore, semantic clues can be injected into the layout in an unsupervised manner, without explicit category annotation.

Unlike objects, the background radiance field is only evaluated in the global space. Considering that the background encodes lots of high-frequency signals, the viewing direction v is included to help background generator $G_{bg}(\cdot)$ to be able to learn such details. The background generation can be formulated as:

$$(c_{bg},\sigma_{bg})=G_{bg}(x,v,z_{bg}). \quad (6)$$

As noted above, spatially-disentangled radiance fields are used to represent scenes. However, naive point sampling solutions can lead to prohibitive computational overhead when rendering multiple radiance fields. Considering the independence of objects' radiance fields, much more efficient rendering can be achieved by focusing on the valid points within the bounding boxes.

Similar to NeRF, a pinhole camera model may be used to perform ray casting. For each object, the points on the rays can be sampled at adaptive depths rather than fixed ones since the bounding box provides clues about where the object locates. Specifically, the cast rays $R=\{r_j | j \in [1, S^2]\}$ in a resolution S are transformed into the canonical object coordinate system. Then, a Ray-AABB (axis-aligned bounding box) intersection algorithm may be applied to calculate the adaptive near and far depth $(d_{j,l,n}, d_{j,l,f})$ of the intersected segment between the ray $r_j$ and the l-th box $B_l$. After that, $N_d$ points are sampled equidistantly in the interval $[d_{j,l,n}, d_{j,l,f}]$. An intersection matrix M is maintained of size $N \times S^2$, whose elements indicate if this ray intersects with the box. With M, valid points are selected to infer, which can greatly reduce the rendering cost.

Different background sampling strategies are adopted depending on the dataset. In general, fixed depth sampling is performed for bounded backgrounds in indoor scenes and the inverse parametrization of NeRF++ is inherited for complex and unbounded outdoor scenes, which uniformly samples background points in an inverse depth range.

In the methods described herein, objects are always assumed to be in front of the background. So objects and background can be rendered independently first and composited thereafter. For a ray $r_j$ intersecting with $n_j (n_j \geq 1)$ boxes, its sample points $X_j = \{x_{j,k} | k \in [1, n_j N_d]\}$ can be easily obtained from the depth range and the intersection matrix M. Since rendering should consider inter-object occlusions, the points X are sorted by depth, resulting in an ordered point set $X_j^s = \{x_{j,s_k} | s_k \in [1, n_j N_d], d_{j,s_k} \leq d_{j,s_k+1}\}$, where $d_{j,sk}$ denotes the depth of point $x_{j,sk}$. With color $c(x_j,s_k)$ and density $\sigma(x_j,s_k)$ of the ordered set inferred with $G_{obj}(\cdot)$ by Equation (5), the corresponding pixel $f(r_j)$ may be calculated as:

$$f(r_j) = \sum_{k=1}^{n_j N_d} T_{j,k} \alpha_{j,k} c(x_{j,s_k}), \quad (7)$$

$$T_{j,k} = \exp\left(-\sum_{o=1}^{K-1} \sigma(x_{j,s_k}) \delta_{j,s_o}\right), \quad (8)$$

$$\alpha_{j,k} = 1 - \exp(-\sigma(x_{j,s_k}) \delta_{j,s_k}). \quad (9)$$

For any ray that does not intersect with boxes, its color and density are set to 0 and $-\infty$, respectively. The foreground object map F can be formulated as:

$$F_j=(f(r_j), \text{ if } \exists m \in M_{:,j}, m \text{ is true; otherwise } F_j=0. \quad (10)$$

Since the background points are sampled at a fixed depth, Equation (6) may be adopted to evaluate background points in the global space without sorting. The background map N also may be obtained by volume rendering similar to Equation (7). Finally, F and N may be alpha-blended into the final image $I_n$ with alpha extracted from Equation (9) as follows:

$$I_n = F + \prod_{k=1}^{n_j N_d} (1-\alpha_{j,k}) \odot N. \quad (11)$$

Although the neural rendering pipeline 150 efficiently composites multiple radiance fields, it may exhibit slow performance when rendering high-resolution images. To mitigate this issue, a high-dimensional feature map may be rendered instead of a 3-channel color in a smaller resolution, followed by a StyleGAN2-like architecture that up-samples the feature map to the target resolution.

Like other GAN-based approaches, discriminators play a role in training. Previous attempts for 3D-aware scene synthesis adopt scene-level discriminators to critique between rendered scenes and real captures. However, such a scene discriminator pays more attention to the global coherence of the whole scene, weakening the supervision for individual objects. Given that each object, especially those far from the camera, occupies a small portion of the rendered frame, the scene discriminator provides a weak learning signal to its radiance field, leading to inadequate training and poor object quality. Also, the scene discriminator shows minimal capability in disentangling objects and background, allowing the background generator $G_{bg}$ to overfit the whole scene easily.

As shown in FIG. 1, an extra object discriminator 170 is added for local discrimination, leading to better object-level supervision. Specifically, with the 3D layout $B_i$ spatially disentangling different objects, the objects are projected into 2D space as $B_i^{2D}$ to extract object patches $P_f = \{P_i | P_i = \text{crop}(I, B_i^{2D})\}$ from synthesized and real scenes images with simple cropping by object cropper 180. The object patches are fed into the object discriminator 170 after being scaled to a uniform size. This approach significantly helps synthesize realistic objects and benefits the disentanglement between objects and the background.

To train the system, the whole generation process is formulated as $I_f = G(B, Z, \zeta)$, where the generator $G(\cdot)$ receives a layout B, a latent code set Z independently sampled from distribution $N(0,1)$ to control objects, and a camera pose $\zeta$ sampled from a prior distribution $p_\zeta$ to synthesize the image $I_f$. During training, B, Z, and $\zeta$ are randomly sampled, and the real image $I_r$ is sampled from the dataset. Besides the generator, the scene discriminator $D_s(\cdot)$ is employed to guarantee the global coherence of the rendering and the object discriminator $D_{obj}(\cdot)$ on individual objects for local discrimination. The generators and discriminators are jointly trained as:

$$\min L_G = E[f(-D_s(I_f))] + \lambda_1 E[f(-D_{obj}(P_{lf}))], \quad (12)$$

$$\min L_D = E[f(-D_s(I_r))] + E[f(D_s(I_f))] + \lambda_1 (E[f(-D_{obj}(P_{lr}))] + E[f(D_{obj}(P_{lf}))]) + \lambda_2 \|\nabla\|_{I_r} D_s(I_r)\|_2^2 + \lambda_3 \nabla P_{lr} D_{obj}(P_{lr})\|_2^2), \quad (13)$$

where $f(t) = \log(1 + \exp(t))$ is the softplus function, and $P_{lr}$ and $P_{lf}$ are the extracted object patches of synthesized image $I_f$ and real image $I_r$, respectively. $\lambda_1$ stands for the loss weight of the object discriminator. The last two terms in Equation (13) are the gradient penalty regularizers of both discriminators, with $\lambda_2$ and $\lambda 3$ denoting their weights.

Figure 2:
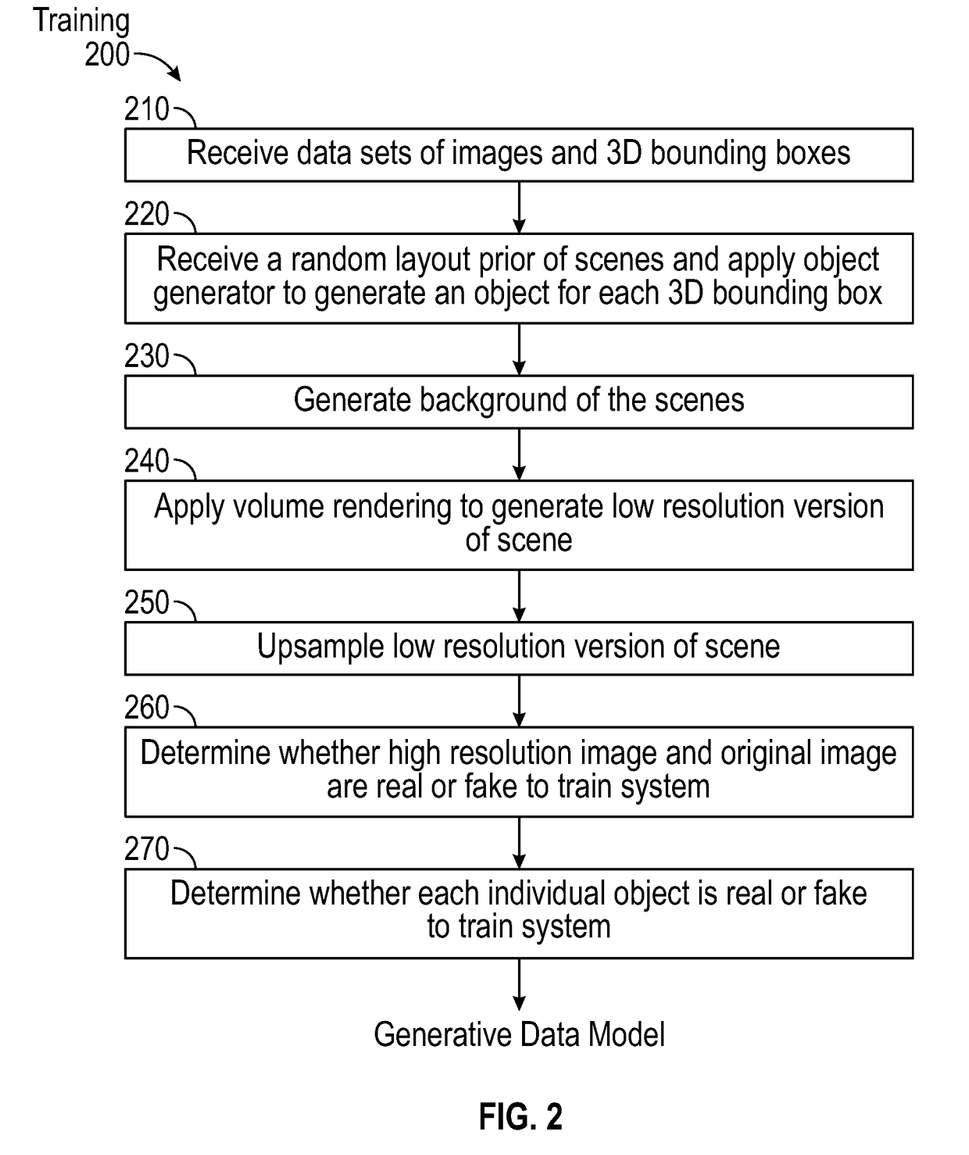
FIG. 2 is a flow chart illustrating a training stage for implementing spatially disentangled generative radiance fields in a sample configuration.

FIG. 2 is a flow chart illustrating a training stage 200 for training on a data set of images and 3D bounding boxes for implementing spatially disentangled generative radiance fields in a sample configuration. As illustrated, the training stage 200 receives data sets of images and 3D bounding boxes at 210. The 3D bounding boxes may be automatically, semi-automatically, or manually annotated. In the example of FIG. 1, the bounding boxes 132 are placed around respective vehicles from the scene. At 220, the training stage 200 receives a layout prior 110 of scenes in the input images that is used by the object generator 120 to generate an object for each 3D bounding box 132. At 230, the background of the scenes is separately generated. The volume renderer 152 of the neural rendering pipeline 150 generates a low resolution version of the scene from the objects for each 3D bounding box and the background of the scenes at 240. The generated low resolution scene is up-sampled at 250 by up-sampler 154 to generate a high resolution version of the scene. During training, the scene discriminator 160 determines at 260 whether the created high resolution version of the inputted scene and the original image are real or fake in order to differentiate the scenes. Finally, at 270, the object discriminator determines from a crop of the original object whether the object is real or fake. The results are used to train the generative data model for use in the inference stage.

During inference, besides high-quality scene generation, the method described herein naturally supports object editing by manipulating the layout prior as shown in FIG. 1. Various applications are described below. Ray marching at a small resolution (64) may cause aliasing especially when moving the objects. Super sampling anti-aliasing (SSAA) software may be used to perform ray marching at a temporary higher resolution (128) and to down-sample the feature map to the original resolution before the up-sampler. This strategy is used for object synthesis; the background resolution is not changed during inference.

Figure 3:
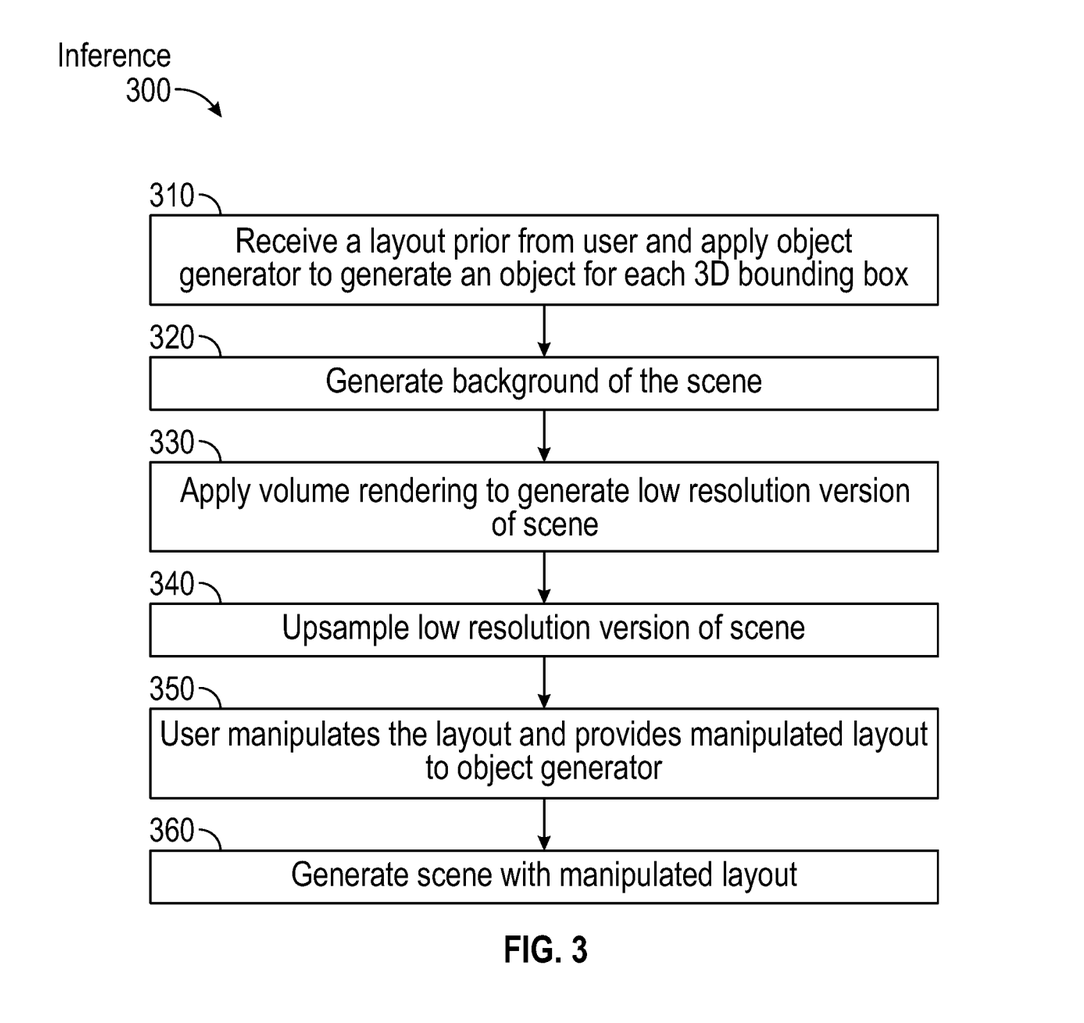
FIG. 3 is a flow chart illustrating an inference stage for implementing spatially disentangled generative radiance fields in a sample configuration.

FIG. 3 is a flow chart illustrating an inference stage 300 for implementing spatially disentangled generative radiance fields in a sample configuration. The inference stage uses the elements of FIG. 1 except that the object discriminator 170 and object cropper 180 are not used.

During the inference stage 300, the user provides a layout prior 110 that is used by the object generator 120 to generate an object for each 3D bounding box 132 at 310. At 320, the background of the scene is separately generated. The volume renderer 152 of the neural rendering pipeline 150 generates a low resolution version of the scene at 330. The generated low resolution scene is up-sampled at 340 by up-sampler 154 to generate a high resolution version of the scene. During inference, the user may manipulate the objects in the layout 110 at 350 to the manipulated layout 190 and provide the manipulated layout 190 to the object generator 120. The scene 195 is then generated at 360 by providing the manipulated objects in place of the original objects to the neural rendering pipeline 150 by, for example, repeating steps 330 and 340 for a scene including the manipulated objects.

The methods described herein were evaluated on three multi-object scene datasets, including CLEVR®, 3D-FRONT, and WAYMO®. CLEVR® is a diagnostic multi-object dataset. The official script was used to render scenes with two and random primitives. The CLEVR® dataset consisted of 80K samples in 256×256 resolution. 3D-FRONT is an indoor scene dataset, containing a collection of 6.8K houses with 140K rooms. 4K bedrooms were obtained after filtering out rooms with uncommon arrangements or unnatural sizes and BlenderProc was used to render 20 images per room from random camera positions, resulting in a total of 80K images. WAYMO® is a large-scale autonomous driving dataset with 1K video sequences of outdoor scenes. Six images are provided for each frame, and the front view was kept. Heuristic rules were applied to filter out small and noisy cars and collect a subset of 70K images. Because the width is always larger than height on WAYMO®, black padding was adopted to make images square, similar with StyleGAN2.

The results were compared with both 2D and 3D GANs. For 2D, the results were compared with StyleGAN2 on image quality. For 3D, the results were compared with EpiGRAF, VolumeGAN, and Efficient Geometry-Aware 3D GAN (EG-3D) on object generation, and GIRAFFE and GSN on scene generation. The baseline models were used that were either released along with their papers or official implementations to train on the data.

For implementation, the architecture and parameters of the mapping network from StyleGAN2 were used. For object generator $G_{obj}(\bullet)$ and background generator $G_{bg}(\bullet)$, 8 and 4 Modulated Fully-Connected layers (ModFCs) with 256 and 128 channels, respectively, were used. Ray casting was performed on 64×64 and the feature map was rendered to image with a neural rendering pipeline. The progressive training strategy from Progressive Growing of GANs (PG-GAN) was adopted for better image quality and multi-view consistency. Discriminators $D_s(\bullet)$ and $D_{obj}(\bullet)$ both shared the similar architecture of StyleGAN2 but with only half channels. Practically, the resolution of $D_{obj}(\bullet)$ is ½ on WAYMO® or ¼ on CLEVR® and 3D-FRONT of $D_s(\bullet)$. $\lambda 1$ was set to 1 to balance object and scene discriminators. $\lambda 2$ and $\lambda 3$ were set to 1 to maintain training stability. Unless specified, other hyperparameters were the same or similar as StyleGAN2.

The results of the qualitative comparisons with the disclosed method were compared on explicit camera control and object editing with baselines. GSN and EG-3D, with a single radiance field, can manipulate the global camera of the synthesized images. GSN highly depends on the training camera trajectories. Thus, in the comparison setting where the camera positions are randomly sampled, the comparison suffers from poor image quality and multi-view consistency. As for EG-3D, although it converges on the datasets, the object fidelity was lower than the described method. On CLEVR® with a narrow camera distribution, the results of EG-3D were inconsistent. In the first example, the color of the cylinder changes from gray to green across different views. Meanwhile, the disclosed method learned better 3D structure of the objects and achieved better camera control. On the challenging WAYMO® dataset, it is difficult to encode huge street scenes within a single generator, thus GIRAFFE and the disclosed method were trained in the camera space to evaluate object editing. GIRAFFE struggled to generate realistic results and, while manipulating objects, their geometry and appearance were not preserved well. On the other hand, the described approach was found to be capable of handling these complicated scenarios with good variations. Wherever the object is placed and regardless of how the rotation is carried out, the synthesized objects were substantially better and more consistent than GIRAFFE, which demonstrates the effectiveness of the disclosed spatially disentangled radiance fields built upon the layout prior.

Table 1 shows the results of the quantitative comparisons. All metrics were calculated between 50K generated samples and all real images. The described method consistently outperformed baselines with significant improvement on all datasets. In addition, training cost in V100 days and testing cost in ms/image (on a single V100 over 1K samples) were also included to reflect the efficiency of the described model. The inference cost of 3D-aware models was evaluated on generating radiance fields rather than images. In such a case, EG-3D and EpiGRAF were not as fast as expected due to the heavy computation on tri-planes. With comparable training and testing cost, the disclosed method even achieves a similar level of image quality with state-of-the-art 2D GAN baselines, e.g., StyleGAN2, while allowing for explicit camera control and object editing that are otherwise challenging.

Table 1 shows the quantitative comparisons on different data sets where FID and KID (×10³) were reported as the evaluation metrics. TR. and INF. denote training and inference costs, respectively. The best results among 3D-aware models are highlighted.

TABLE 1

| Model | CLEVR® | | | | 3D-FRONT | | WAYMO® | |
|---|---|---|---|---|---|---|---|---|
| | FID ↓ | KID ↓ | TR. ↓ | INF. ↓ | FID ↓ | KID ↓ | FID ↓ | KID ↓ |
| StyleGAN2 | 4.5 | 3.0 | 13.3 | 44 | 12.5 | 4.3 | 15.1 | 8.3 |
| EpiGRAF | 10.4 | 8.3 | 16.0 | 114 | 107.2 | 102.3 | 27.0 | 26.1 |
| VolumeGAN | 7.5 | 5.1 | 15.2 | 90 | 52.7 | 38.7 | 29.9 | 18.2 |
| EG3D | 4.1 | 12.7 | 25.8 | 55 | 19.7 | 13.5 | 26.0 | 45.4 |
| GIRAFFE | 78.5 | 61.5 | 5.2 | 62 | 56.5 | 46.8 | 175.7 | 212.1 |
| GSN | — | — | — | — | 130.7 | 87.5 | — | — |
| SDRF | 3.5 | 2.1 | 18.1 | 95 | 13.8 | 7.4 | 16.0 | 8.4 |

Figure 4:
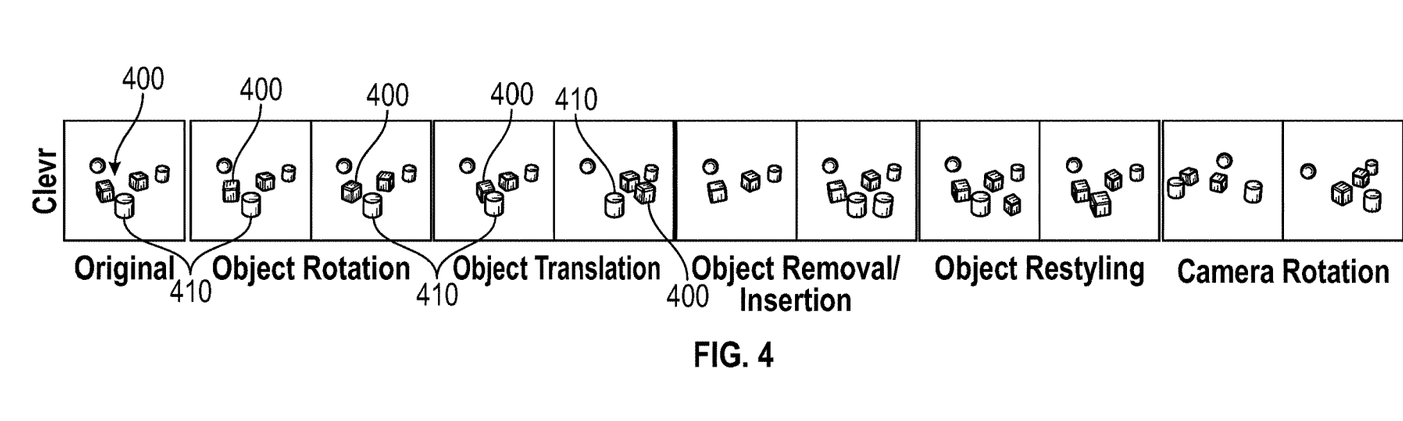
FIG. 4 illustrates controllable scene synthesis using a CLEVR® dataset in the described system in a sample configuration.

The layout prior in the described model enables versatile user controls of scene objects. The flexibility and effectiveness of the described model through various 3D manipulation applications in different datasets are described below. As example is shown in FIG. 4, which illustrates controllable scene synthesis in 256×256 resolution. Versatile user control of the global camera and scene objects, such as rearrangement, removal, insertion, and restyling were performed for the CLEVR® dataset. Edits were performed on the original generation at the left of the row.

Bounding boxes B can be transformed to rearrange (rotation and translation) the objects in the scenes without affecting their appearance. Transforming shapes in CLEVR® (FIG. 4), furniture in 3D-FRONT, and cars in WAYMO® all show consistent results. In particular, rotating symmetric shapes (i.e., spheres and cylinders) in CLEVR® showed little changes, suggesting desired multi-view consistency. The disclosed model also can properly handle mutual occlusion. For example, the described model can produce new occlusions between the cube 400 from CLEVR® in the first row of FIG. 4 and the cylinder 410 and generate high-quality renderings.

Users can update the layout by removing or cloning bounding boxes. The described method seamlessly removes objects with the background inpainted realistically, even without training on any pure background, including the challenging dataset of WAYMO®. Object cloning is also naturally supported, by copying and pasting a box to a new location in the layout.

Although appearance and shape are not explicitly modeled by the latent code, the encoded hierarchical knowledge can be reused to perform object restyling. Latent codes may be arbitrarily sampled and style-mixing performed on different layers to achieve independent control over appearance and shape. FIG. 4 presents the restyling results on certain objects, i.e., the front cylinder 410 in CLEVR®.

Explicit camera control is also permitted. Even for CLEVR® that is trained on very limited camera ranges, the camera may be rotated up to an extreme side view. The described model also produces consistent results when rotating the camera on 3D-FRONT.

Main components of the described method were ablated to better understand the individual contributions. In addition to the FID score that measures the quality of the entire image, another metric $FID_{obj}$ is provided to measure the quality of individual objects. Specifically, the projected 2D boxes were used to crop objects from the synthesized images and then FID evaluation was performed against the ones from real images.

The object discriminator $D_{obj}$ plays a role in synthesizing realistic objects, as evaluated in the ablation analysis of $D_{obj}$ in Table 2 below. The object fidelity was significantly improved across all datasets with $D_{obj}$. Also, the quality of the whole scene generation was improved as well, contributed by better objects. Although the baseline model was able to disentangle objects on 3D-FRONT from simple background to a certain extent, the background suffered from the entanglement with objects, resulting in obvious artifacts as well as illogical layout. On more challenging datasets like WAYMO®, the complex backgrounds make the disentanglement even more difficult, so that the background model easily overfits the whole scene as a single radiance field. Thanks to the object discriminator, the full model benefits from object supervision, leading to better disentanglement, even without seeing a pure background image.

TABLE 2

|  |  | CLEVR® | 3D-FRONT | WAYMO® |
|---|---|---|---|---|
| FID | w/o $D_{obj}$ | 5.0 | 18.6 | 19.5 |
|  | w/ $D_{obj}$ | 3.5 | 13.8 | 16.0 |
| $FID_{obj}$ | w/o $D_{obj}$ | 19.1 | 33.7 | 95.1 |
|  | w/ $D_{obj}$ | 5.6 | 19.5 | 16.3 |

To analyze how spatial condition (SCond) affects the quality of generation, the results were compared with models trained with and without S-Cond on 3D-FRONT. For example, the full model consistently inferred beds at the center of rooms, while the baseline predicted random items like tables or nightstands that rarely appeared in the middle of bedrooms. These results demonstrate that spatial condition can assist the generator with appropriate semantics from simple layout priors. This correlation between spatial configurations and object semantics is automatically emerged without any supervision.

The image quality on these two models is numerically compared in Table 3 below, which shows that S-Cond also achieves better image quality at both scene-level and object-level because more proper semantics are more in line with the native distribution of real images.

TABLE 3

|  | FID | | $FID_{obj}$ | |
|---|---|---|---|---|
|  | w/ S-Cond | w/o S-Cond | w/ S-Cond | w/o S-Cond |
| 3D-FRONT | 13.8 | 15.2 | 19.5 | 23.2 |

A simple super-sampling anti-aliasing (SSAA) strategy was adopted to reduce edge aliasing by sampling more points during inference. Thanks to efficient object point sampling by the described method, doubling the resolution of foreground points keeps a similar inference speed (105 ms/image), comparable with the original speed (95 ms/image). When an object is moved, SSAA achieves more consistent boundary compared with a jaggy boundary in the baseline.

The StyleGAN2-like neural rendering pipeline 150 was adopted to boost the rendering efficiency. Besides the low computational cost, the added capacity of the neural rendering pipeline 150 also brings better implicit modeling of realistic lighting effects such as shadowing. Therefore, without handling the shadowing effect in the neural rendering pipeline 150, the described model can still synthesize high-quality shadows on datasets such as CLEVR®. This is because the large receptive field brought by 3×3 convolutions (e.g., volume renderer 152) and up-sampler blocks (e.g., up-sampler 154) make the neural rendering pipeline 150 aware of the object locations and progressively adds shadows to the low resolution features rendered from radiance fields.

Figure 5:
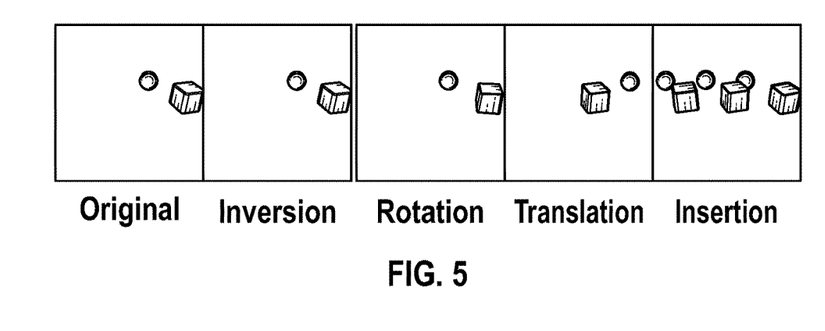
FIG. 5 illustrates real image inversion and editing using a CLEVR® dataset in the described system in a sample configuration.

FIG. 5 illustrates that it is possible to embed a real image into the latent space of the pretrained model using pivotal tuning inversion (PTI) that provides real image inversion and editing. Besides reconstruction, all object manipulation operations are supported to edit the image.

Those skilled in the art will appreciate that the model described herein for controllable 3D-aware scene synthesis uses an abstract layout prior as the input. By taking spatially disentangled radiance fields as the representation based on a very abstract layout prior, the described method is able to generate high-fidelity scene images and allows for versatile object-level editing. For in-the-wild datasets, a monocular 3D object detector may be needed to infer pseudo layouts. Also, while existing approaches attempt to learn the layout in an end-to-end manner, they struggle to generalize to complex scenes consisting of multiple objects. 3D layout estimation may be used for complex scenes and combined with the described method end-to-end. In addition, although the described method shows significant improvement over existing 3D-aware scene generators, it is still challenging to learn on the street scenes in the global space due to limited model capacity. Large-scale NeRFs might be used to address this limitation.

Figure 6:
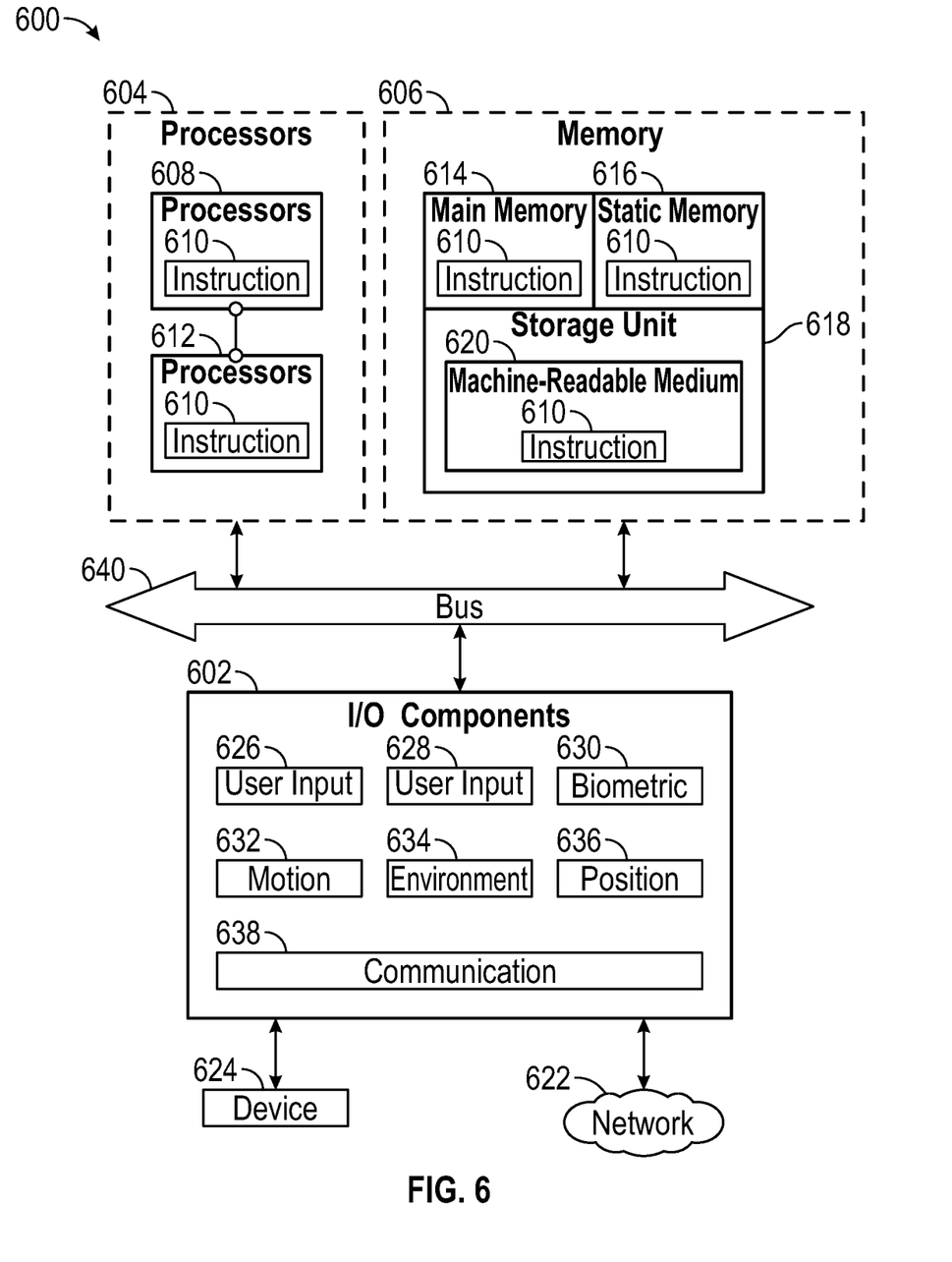
FIG. 6 is a block diagram of a machine within which instructions (e.g., software, a program, an application, an applet, an app, or other executable code) for causing the machine to perform any one or more of the methodologies discussed herein may be executed.

FIG. 6 is a diagrammatic representation of the machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the framework 100 (FIG. 1). In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC)

Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processors 608 and processor 612s that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 for any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Figure 7:
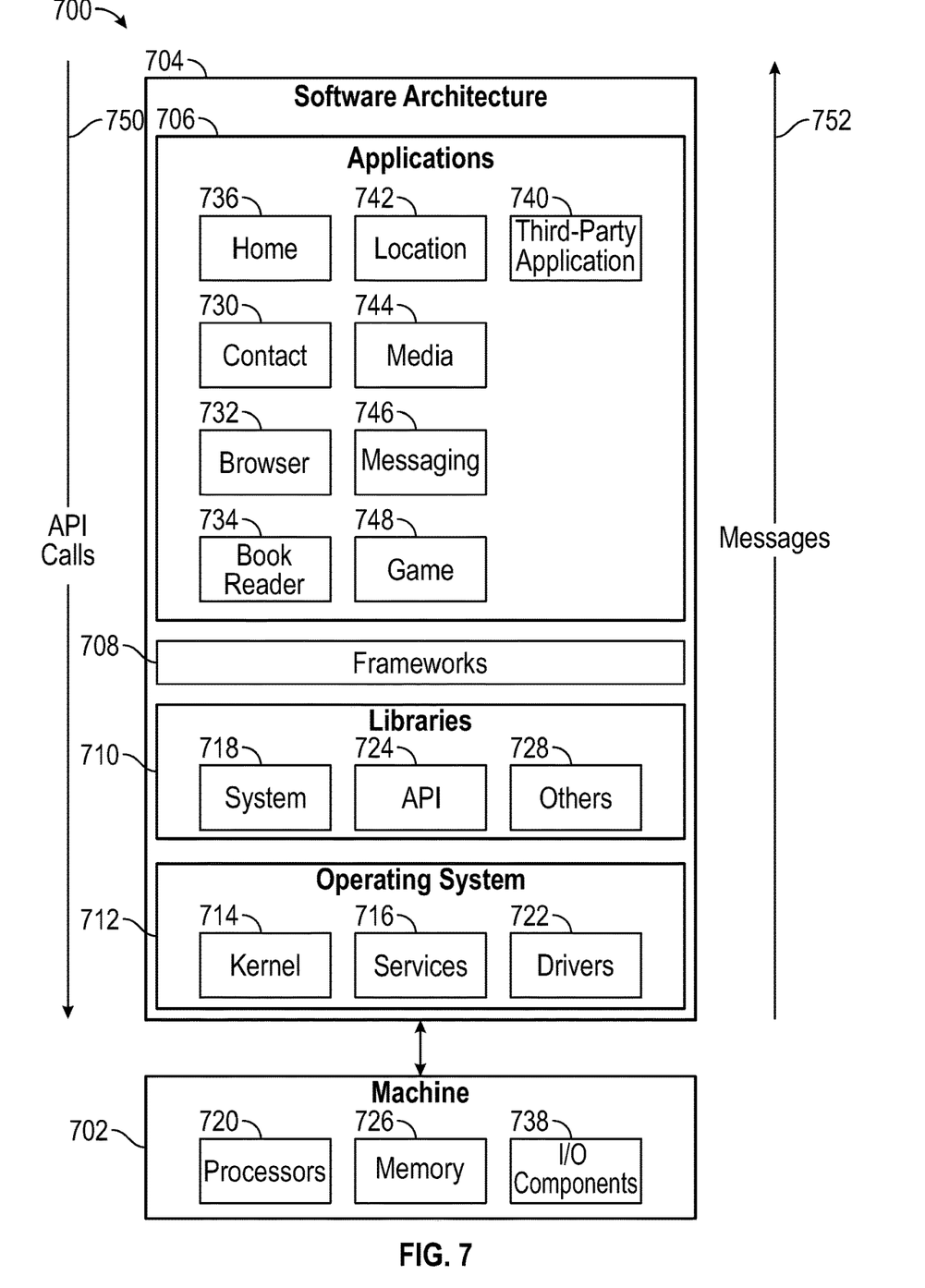
FIG. 7 is a block diagram showing a software architecture within which examples described herein may be implemented.

FIG. 7 is a block diagram 700 illustrating a software architecture 704, which can be installed on any one or more of the devices described herein. The software architecture 704 is supported by hardware such as a machine 702 (see FIG. 6) that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to generate one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of generating individual objects and a background of a three-dimensional (3D) scene, the method comprising:
    receiving, by an object generator, a data set of input images and 3D bounding boxes of objects in the input images;
    receiving, by the object generator, a layout prior of a scene in the input images;
    generating, by the object generator, an object for each 3D bounding box;
    generating, by a background generator, a background of the scene;
    compositing, by a volume renderer, the scene to a feature map to place the objects in the scene for each 3D bounding box relative to the background of the scene;
    enabling a user to manipulate at least one of a position, orientation, or scale of one or more objects in the layout prior to create manipulated layout prior;
    generating, by the object generator, a scene with the objects in positions, orientations, and scales represented in the manipulated layout prior; and
    up-sampling the feature map to generate a 3D scene including the objects.

2. The method of claim 1, wherein enabling a user to manipulate the objects in the layout prior to create a manipulated layout prior comprises enabling the user to manipulate a 3D bounding box using ray casting from a viewpoint of the user.

3. The method of claim 1, further comprising:
    generating a generative data model by training on a data set of images and 3D bounding boxes for implementing spatially disentangled generative radiance fields, the training comprising:
    receiving, by the object generator, data sets of input images and 3D bounding boxes of objects in the input images;
    receiving, by the object generator, a layout prior of scenes in the input images;
    generating, by the object generator, an object for each 3D bounding box;
    generating, by the background generator, a background of the scenes;
    generating, by the volume renderer, versions of the scenes from the objects for each 3D bounding box and the background of the scenes; and
    performing global-local discrimination by determining, by a scene discriminator, whether the versions of the scenes in input images are real or fake to differentiate scenes, and determining, by an object discriminator, from a crop of objects in the input images whether objects are real or fake to train the generative data model.

4. The method of claim 1, further comprising performing ray marching using super sampling anti-aliasing (SSAA) of the feature map at a temporary higher resolution and down-sampling the feature map to an original resolution of the input image before up-sampling.

5. The method of claim 1, wherein generating, by the object generator, the object for each 3D bounding box comprises generating spatially disentangled generative radiance fields of the object for each 3D bounding box based on the layout prior to generate individual objects and the background of the scene.

6. The method of claim 1, wherein compositing, by the volume renderer, the scene to the feature map to place the objects in the scene for each 3D bounding box relative to the background of the scene comprises rendering the objects for each 3D bounding box and the background separately and compositing the object for each 3D bounding box in front of the background.

7. A system for generating individual objects and a background of a three-dimensional (3D) scene, the system comprising:
    an object generator that receives a data set of input images and 3D bounding boxes of objects in the input images and a layout prior of a scene in the input images, the object generator generating an object for each 3D bounding box;
    a background generator that generates a background of the scene;
    a volume renderer that composites the scene to a feature map to place the objects in the scene for each 3D bounding box relative to the background of the scene; and
    an up-sampler that up-samples the feature map to generate a 3D scene including the objects,
    wherein the object generator further receives a manipulated layout prior including one or more objects having at least one of a position, orientation, or scale manipulated in the layout prior and generates a scene with the objects in positions orientations, and scales represented in the manipulated layout prior.

8. The system of claim 7, further comprising ray casting software that enables a user of the system to manipulate a 3D bounding box by ray casting from a viewpoint of the user.

9. The system of claim 7, further comprising:
    a global-local discriminator comprising a scene discriminator that determines whether scenes in input images are real or fake to differentiate scenes and an object discriminator that determines from a crop of objects in the input images whether objects are real or fake to train a generative data model, wherein the generative data model is used by the object generator to generate the scene with the objects in positions, orientations, and scales represented in the manipulated layout prior.

10. The system of claim 7, further comprising super sampling anti-aliasing software that ray marches the feature map at a temporary higher resolution and down-samples the feature map to an original resolution of the input image before up-sampling by the up-sampler.

11. The system of claim 7, wherein the object generator generates the object for each 3D bounding box by generating spatially disentangled generative radiance fields of the object for each 3D bounding box based on the layout prior to generate individual objects and the background of the scene.

12. The system of claim 7, wherein the volume renderer composites the scene to the feature map to place the objects in the scene for each 3D bounding box relative to the background of the scene by rendering the objects for each 3D bounding box and the background separately and compositing the object for each 3D bounding box in front of the background.

13. A non-transitory computer-readable storage medium, the computer-readable storage medium including instructions that when executed by a processor cause the processor to generate individual objects and a background of a three-dimensional (3D) scene by performing operations comprising:

receiving a data set of input images and 3D bounding boxes of objects in the input images;
receiving a layout prior of a scene in the input images;
generating an object for each 3D bounding box;
generating a background of the scene; and
generating a version of the scene from the objects for each 3D bounding box and the background of the scene;
compositing the scene to a feature map to place the objects in the scene for each 3D bounding box relative to the background of the scene;
enabling a user to manipulate at least one of a position, orientation, or scale of one or more objects in the layout prior to create a manipulated layout prior;
generating a scene with the objects in positions, orientations, and scales represented in the manipulated layout prior; and
up-sampling the feature map to generate a 3D scene including the objects.

14. The medium of claim 13, further comprising instructions that when executed by the processor cause the processor to further perform operations comprising:

generating a generative data model by training on a data set of images and 3D bounding boxes for implementing spatially disentangled generative radiance fields, the training comprising:
receiving data sets of input images and 3D bounding boxes of objects in the input images;
receiving a layout prior of scenes in the input images;
generating an object for each 3D bounding box;
generating a background of the scenes;
generating versions of the scenes from the objects for each 3D bounding box and the background of the scenes;
performing global-local discrimination by determining whether the versions of the scenes in the inputted images are real or fake to differentiate scenes, and by determining from a crop of objects in the input images whether objects are real or fake to train the generative data model; and
using the generative data model to generate the scene with the objects in positions, orientations, and scales represented in the manipulated layout prior.

15. The medium of claim 13, wherein the instructions for generating the object for each 3D bounding box further comprises instructions that when executed by the processor cause the processor to perform further operations comprising:

generating spatially disentangled generative radiance fields of the object for each 3D bounding box based on the layout prior to generate individual objects and the background of the scene.

* * * * *